Sept. 8, 1959
B. E. COUSINS
2,903,210
MIRROR MOUNTING BRACKET
Filed Feb. 18, 1957
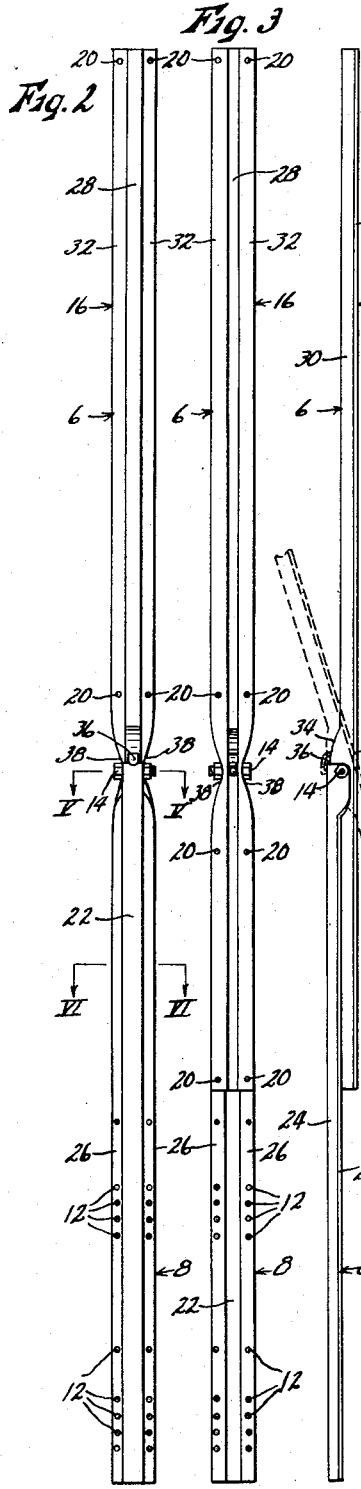
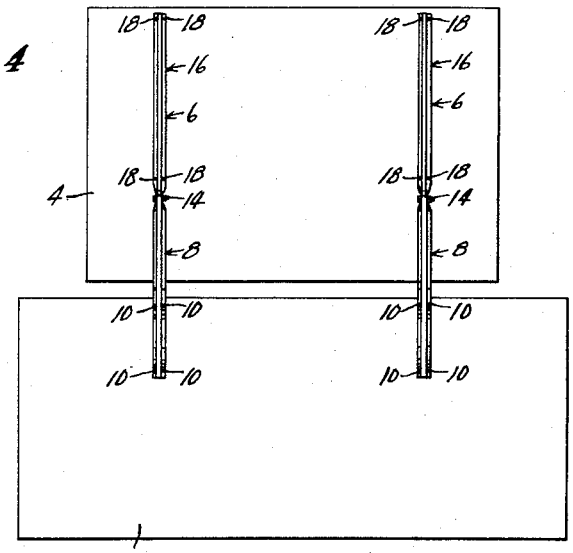
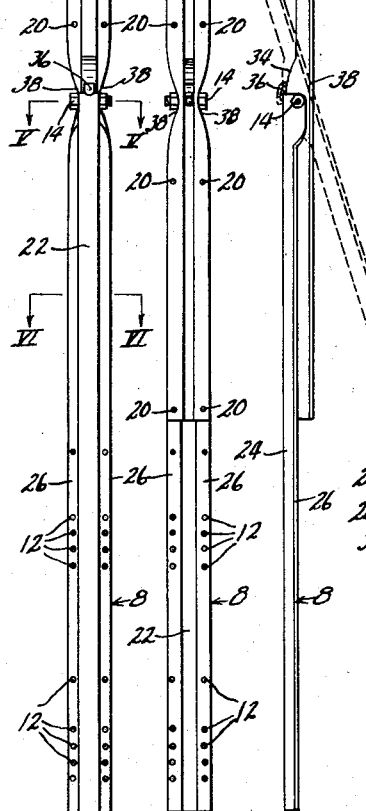
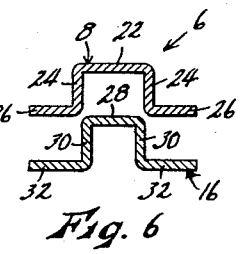
INVENTOR
Boyd E. Cousins
BY John A. Hamilton
Attorney.

United States Patent Office 2,903,210
Patented Sept. 8, 1959

2,903,210

MIRROR MOUNTING BRACKET

Boyd E. Cousins, Kansas City, Mo.

Application February 18, 1957, Serial No. 640,647

3 Claims. (Cl. 248—28)

This invention relates to new and useful improvements in mirror mounting brackets of the type used to mount mirrors on dressers, dressing tables, chests of drawers and the like, and relates more specifically to brackets whereby the mirror is mounted for pivotal movement about a horizontal axis, whereby the angle thereof may be adjusted to the convenience of each individual user.

The principal object of the present invention is the provision of a mirror mounting bracket of the general class described which is specially constructed to provide a pivotal joint which is frictionally loaded to hold the mirror supported thereby securely at any desired angle, which will maintain its frictional loading even after protracted periods of use and wear, and wherein the frictional loading of the joint requires no additional springs or other parts.

Other objects are extreme simplicity and economy of construction, efficiency and dependability of operation, and adaptability of the inventive principles involved to be utilized in many applications.

With these objects in view, as well as other objects which will appear in the course of the specification, reference will be had to the drawing, wherein:

Fig. 1 is a rear elevational view of a dresser showing a mirror frame attached thereto by a pair of mounting brackets each embodying the present invention, Figs. 2 and 3 are respectively enlarged rear and front elevational views of one of brackets, shown detached from the dresser and mirror frame, Fig. 4 is a side elevational view of the bracket, showing the portion thereof which carries the mirror in a tilted position in dotted lines, Figs. 5 and 6 are enlarged sectional views taken respectively on lines V—V and VI—VI of Fig. 2, and Fig. 7 is an enlarged fragmentary sectional view taken on line VII—VII of Fig. 5.

Like reference numerals apply to similar parts throughout the several views, and the numeral 2 applies to a dresser or the like to which a mirror frame 4 carrying a mirror, not shown, is mounted by means of a pair of brackets 6 each embodying the present invention. Each of said brackets includes an elongated standard 8 adapted to be secured at its lower end portion to dresser 2 by screws 10 inserted through holes 12 provided in said standard (see Figs. 2 and 3). It will be noted that a plurality of holes 12 spaced longitudinally along the standard are provided, in order that screws 10 may be inserted at whatever points dresser 2 provides substantial members for engaging said screws. Each standard is disposed vertically, and extends well above the dresser. At its upper end, it is pivoted by means of bolt 14 to an elongated arm 16 which is affixed to the back of mirror frame 4 by a plurality of screws 18 inserted through holes 20 provided in said arm and threaded into the mirror frame. Pivot bolts 14 are horizontal coaxial, and parallel to the plane of the mirror frame.

For strength and rigidity, despite the use of a relatively light gauge of metal, each standard 8 is formed with a cross-sectional contour as clearly shown in Fig. 6, being channel shaped with a web 22 and parallel side walls 24, and having an outwardly extending longitudinal flange 26 at each edge thereof. Each arm 16 is similarly shaped, having a web 28, parallel side walls 30, and flanges 32. Flanges 26 rest flat against dresser 2, and screw holes 12 for screws 10 are formed in said flanges. Flanges 32 rest flat against mirror frame 4, and holes 20 for screws 18 are formed in said flanges.

As best shown in Figs. 5 and 6, the width of web 22 of standard 8 is greater than the width of web 28 of arm 16, so that the standard nests over the arm, as best shown in Fig. 5, and bolt 14 extends through side walls 24 and 30 of the standard and arm respectively. This nesting permits the mirror frame to be positioned closer than is customary to the rearward edge of the dresser, and thus permits fuller utilization of the dresser top area than is possible with brackets which require the mirror to be offset substantially forwardly from the standards of the brackets. It will be noted also that web 28 of arm 16 is offset rearwardly or outwardly adjacent bolt 14, as indicated at 34, in order to provide ample room for the bolt. A small tab 36 is struck out from offset portion 34 of web 28, and forms a hook which overlaps the end of web 22 of the standard, as best shown in Fig. 7. As shown in Fig. 4, this hook serves to limit the pivotal movement of arm 16 relative to the standard.

The pivotal connection provided by bolt 14 is frictionally loaded by the fact that side walls 24 and 30 of the standard and arm are deflected inwardly by the tension of the bolt. However, if the joint is to remain frictionally tight through periods of long usage, said side walls must be deflected inwardly to a rather pronounced degree so that the frictional load will be maintained by elastic recovery of said walls as the parts wear in use. Also, the force required to deflect said side walls should not be excessive, so as to overload the joint in deflecting said walls. With the connection as thus far described, however, the parts are stiffened to such a degree by the presence of flanges 26 and 32 that the side walls cannot be readily deflected toward each other. Hence while the joint could be initially loaded to the proper degree by tightening the bolt, it would work loose in a short time due to wearing of the walls under friction, and due to their inability to recover elastically to take up the slack. To overcome this difficulty, I have notched away flanges 32 of arm 16 immediately adjacent bolt 14, the notches being indicated at 38. Also, the flanges 26 of standard 8, immediately adjacent bolt 14, are bent into the planes of side walls 24, so as to form coplanar extensions of said side walls. Thus the rigidity of the members which woud tend to prevent the side walls from being drawn toward each other by the bolt is largely eliminated, or greatly reduced. Thus said side may be deflected without overloading the joint, and the walls will be able to spread apart elastically as wear occurs. It will of course be apparent that the standard and arm must be formed of a metal possessing at least a reasonable degree of resiliency. The yieldability of the side walls to provide a long-lived frictional joint is accomplished, at the same time, without materially affecting the strength and rigidity originally provided by the flanged construction of the members. Deformation of the standard flanges 26, being at the extreme end of said standard, will not appreciably affect the bending strength of the standard. While notches 38 will reduce the strength of arm 16 in a plane parallel to the mirror, this weakening effect is overcome by positioning certain of screws 18 immediately above and below said notches, whereby the arm is reinforced by direct attachment to the mirror frame.

While I have shown and described a specific embodiment of my invention, it will be apparent that many minor changes of structure and operation could be made without departing from the spirit of the invention as defined by the scope of the appended claims.

What I claim as new and desire to protect by Letters Patent is:

1. A mirror mounting bracket comprising a standard adapted to be attached at its lower end to a furniture piece and to extend thereabove, an arm adapted to be secured to a mirror frame, and a pivot bolt pivotally connecting the upper end of said standard to an intermediate point of said arm, said standard and said arm each having a channel shaped cross-sectional contour including a pair of generally parallel spaced apart side walls and being formed of a resiliently deformable material, said arm channel being nested within said standard channel at their pivotal point with their respective side walls in engagement, said pivot bolt being of uniform diameter and passing through said side walls of both of said channel members and being tightened sufficiently to deflect said side walls resiliently toward each other to impose a frictional resistance on the relative pivotal movement of said standard and arm.

2. A mirror mounting bracket as recited in claim 1 wherein said standard and arm channels are each provided with an outwardly extending longitudinal flange at each side thereof, whereby to impart additional rigidity to said members, said flanges being omitted in the area of said pivot bolt.

3. A mirror mounting bracket as recited in claim 1 wherein said standard and arm channels are each provided with an outwardly extending longitudinal flange at each side thereof, whereby to impart additional rigidity to said members, said flanges being omitted in the area of said pivot bolt, said arm channel flanges being perforated to receive means for securing said arm channel to said mirror frame, certain of said perforations being disposed adjacent said pivot bolt.

References Cited in the file of this patent

UNITED STATES PATENTS

| 687,031 | Jeffcott | Nov. 19, 1901 |
| 1,585,547 | Jones | May 18, 1926 |
| 1,927,515 | Eastman | Sept. 19, 1933 |
| 2,688,901 | Haugaard | Sept. 14, 1954 |

FOREIGN PATENTS

| 536,677 | Great Britain | May 22, 1941 |